(12) United States Patent
Chan (10) Patent No.: US 7,318,371 B2
(45) Date of Patent: Jan. 15, 2008

(54) BEVERAGE MAKING APPARATUS

(76) Inventor: Wing Kin Chan, Block A-C, 4/F., Wing Hin Factory Building, 31-33 Ng Fong Street, San Po Kong, Kowloon, Hong Kong SAR (CN)

( * ) Notice: Subject to any disclaimer, the term of this patent is extended or adjusted under 35 U.S.C. 154(b) by 0 days.

(21) Appl. No.: 10/518,895

(22) PCT Filed: Jun. 24, 2003

(86) PCT No.: PCT/IB03/02443

§ 371 (c)(1),
(2), (4) Date: May 18, 2005

(87) PCT Pub. No.: WO2004/002278

PCT Pub. Date: Jan. 8, 2004

(65) Prior Publication Data

US 2005/0238338 A1    Oct. 27, 2005

(30) Foreign Application Priority Data

Jun. 26, 2002   (CN) ............................... 02104761.7

(51) Int. Cl.
*A47J 31/00* (2006.01)
(52) U.S. Cl. .................... 99/281; 99/302 R; 99/307
(58) Field of Classification Search .......... 99/280–283, 99/288–303, 451, 306, 307, 323.1, DIG. 14; 426/241, 433, 594–596; 219/688, 689
See application file for complete search history.

(56) References Cited

U.S. PATENT DOCUMENTS

| | | | |
|---|---|---|---|
| 3,757,670 A * | 9/1973 | Laama et al. ............. 99/302 R |
| 3,935,804 A * | 2/1976 | Perez ........................... 99/293 |
| 4,104,957 A * | 8/1978 | Freedman et al. ............ 99/283 |
| 4,167,899 A * | 9/1979 | McCormick .............. 99/302 R |
| 4,345,512 A * | 8/1982 | Moore .......................... 99/323 |
| 4,381,696 A * | 5/1983 | Koral ........................... 99/304 |
| 4,386,109 A * | 5/1983 | Bowen et al. .............. 426/241 |
| 4,498,375 A * | 2/1985 | Bedini ......................... 99/303 |
| 5,747,782 A * | 5/1998 | Orrico et al. ............... 219/689 |
| 6,026,733 A   | 2/2000 | Orrico et al. |

FOREIGN PATENT DOCUMENTS

| BE | 635160 A | 11/1963 |
|---|---|---|
| DE | 19914651 A | 10/2000 |

* cited by examiner

Primary Examiner—Timothy F. Simone
(74) Attorney, Agent, or Firm—Buchanan Ingersoll & Rooney PC (57) ABSTRACT

An beverage making apparatus making including a fluid compartment (20), a beverage compartment (40), beverage processing means (51), heating means (30) and heating power control means (32), said beverage processing means (51) interconnecting said fluid compartment and said beverage compartment so that said fluid compartment and said beverage compartment being communicable via said beverage processing means, said heating means being adapted for heating said fluid compartment so that steam generated in said fluid compartment will force fluid to move from said fluid compartment to said beverage compartment via said beverage processing means, wherein the heating power of said heating means being user controllable.

19 Claims, 6 Drawing Sheets

SECTION 1-1

BEVERAGE MAKING APPARATUS

FIELD OF INVENTION

The present invention relates to beverage making means, devices and apparatus. More particularly, this invention relates to apparatus for making beverages from generally insoluble beverage brewing substances.

BACKGROUND OF THE INVENTION

Beverage making apparatus with arrangements to draw favour from beverage making substances, such as, ground coffee beans, tea leaves, herbal leaves or the like, while leaving the insoluble residue behind are well known.

The percolated coffee maker is a common example of such brewing apparatus. In a percolated coffee maker, boiling water is supplied to a filter charged with ground coffee bean. The boiling water dissolves the soluble flavouring substances of the coffee bean during its transit through the filter. The beverage slowly gets through the filter by gravity and is then collected by a beverage container underneath the filter. The brewing process in this type of beverage maker is slow and generally uncontrollable by the user once the brewing substances and the filter have been selected.

The Mocha-type coffee maker is another common known example of beverage makers in which boiling water is forced through a perforated brewing compartment and carrying with it the flavour drawn from the beverage making substances. Although this type of active brewing is faster, the brewing process is substantially uncontrollable by the user. Therefore, conventional beverage brewing apparatus are not suitable for applications in which good control of the brewing process is essential, desirable or preferable.

Hence, it will be desirable if there can be provided beverage making apparatus in which the brewing processes can be controlled or substantially controllable by a user. It is further desirable if such beverage making apparatus are simple to use and non-expensive.

OBJECT OF THE INVENTION

Therefore, it is an object of the present invention to provide beverage making apparatus with substantially user controllable brewing processes. At a minimum, it is an object of the present invention to provide the public with a useful choice of beverage brewing apparatus.

SUMMARY OF THE INVENTION

According to the present invention, there is provided a beverage making apparatus including a fluid compartment, a beverage compartment, beverage processing means, heating means and user controllable heating power control means, said fluid compartment and said beverage compartment being communicable via said beverage processing means, said heating means being adapted for heating fluid inside said fluid compartment so that, when in use, steam generated in said fluid compartment will force fluid to move from said fluid compartment to said beverage compartment via said beverage processing means, characterised in that, the flavour of beverages made by said apparatus being controllable by varying the rate of steam production in said fluid compartment through varying the heating power output of said heating means via said user controllable heating power control means on said apparatus.

According to a preferred embodiment, there is provide an apparatus for making beverages including:
a main container including a top portion, a bottom portion and a peripheral wall interconnecting said top and bottom portions;
a beverage processing module including a receptacle for receiving beverage making substances, partitioning means separating said main container into a fluid compartment and a beverage compartment, a first fluid guiding means for guiding fluid to move from said first fluid movement to said receptacle, a second fluid guiding means for guiding fluid to move from said receptacle to said beverage compartment, said fluid compartment being defined between said partitioning means and said bottom portion of said main container, said beverage compartment being defined between said partitioning means and said top portion of said main container, said fluid compartment and said beverage compartment being generally not communicable except through said receptacle, and said partitioning means being slidably movable inside said main container and along said peripheral wall, and
Electrical heating means for heating said fluid compartment.

Preferably, said apparatus including a base on which said fluid compartment is supported, said electrical heating means being a variable power output electrical heating means, wherein the rate of steam production in said fluid compartment being controllable by varying the power output of said heating means.

Preferably, when in use, said fluid compartment being heated by said heating means in said supporting base to generate steam for moving fluid from said fluid compartment to said beverage compartment.

Preferably, said beverage making apparatus including a control panel supported on said base, said control panel including a power output controlling and indicating means.

Preferably, said heating means including electrical heating elements disposed underneath said fluid compartment, the heating power output and the consequential rate of steam generation being variable by said control means, said control means and said heating means being disposed on a housing which is detachably connectable with either said fluid compartment or said beverage compartment.

Preferably, said beverage compartment being detachably connectable to said fluid compartment so that, when in use, said beverage processing means being sandwiched between said fluid compartment and said beverage compartment.

Preferably, the junctions between said beverage processing means and said fluid compartment being substantially air-tight.

Preferably, said beverage processing means including an overflow means through which fluid from said fluid compartment enters said beverage compartment through.

Preferably, said overflow means including a fluid discharge outlet which is elevated above the bottom portion of said beverage compartment.

Preferably, said apparatus including a container having a top portion, a bottom portion, and a peripheral wall interconnecting said top and bottom portions, said beverage processing means being a modular sub-assembly which is slidably movable along said peripheral wall, said beverage processing means including sealing means for partitioning said container into said fluid compartment and said beverage compartment, said beverage compartment being proximal to said top portion of said container.

Preferably, said apparatus further including means for restricting movements of said beverage processing means within said container.

Preferably, said modular beverage processing means including a hollow compartment intermediate of said top and bottom portions of said container for receiving beverage making substances, said modular beverage processing means further including partitioning means for separating said container into said fluid compartment and said beverage compartment, said partitioning means including a fluid blocking member extending between said hollow compartment and said peripheral wall of said container, said beverage compartment being defined between said fluid blocking member and said top portion of said container, said fluid compartment being defined between said blocking member and said bottom portion of said container.

Preferably, a sealing member is disposed between the outer end of said blocking member and the inside of said peripheral wall of said container.

Preferably, said sealing member including an O-ring.

Preferably, said beverage processing means being restrained within said container by a lid which covers the top portion of said container.

Preferably, said first fluid guiding means including a tubular member extending from said receptacle towards said bottom portion of said main container, said tubular member including at least a fluid inlet aperture, said second fluid guiding means including a tubular member extending from said receptacle towards said top portion of said main container, said tubular member including a fluid outlet aperture disposed at level elevated above said receptacle.

Preferably, said receptacle including means for retaining said beverage making substances within said receptacle.

Preferably, said means for retaining said beverage making substances including means for blocking solid granules such as a grille, a screen, a fitter, a mesh or the like.

Preferably, said apparatus including a base on which the bottom portion of said main container is supported and inside which electric heating means is installed.

Preferably, said apparatus including power controlling means for varying the heating power generated by said heating means.

Preferably, said apparatus being made of microwave compatible material so that the fluid in said container can be heated by a microwave oven.

BRIEF DESCRIPTION OF THE DRAWINGS

Preferred embodiments of beverage brewing or making apparatus of the present invention will be explained in further detail below by way of examples and with reference to the accompanying drawings, in which.

DETAILED DESCRIPTION OF THE PREFERRED EMBODIMENTS

Figure 1:
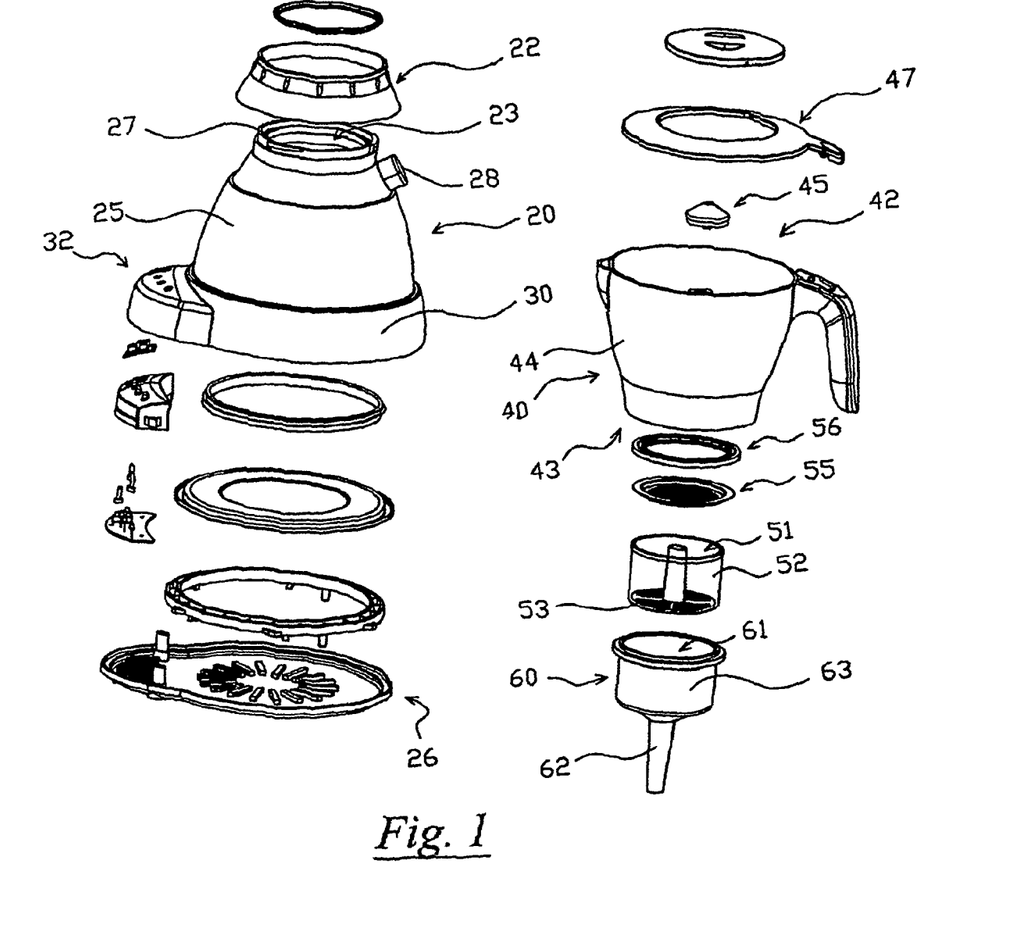
FIG. 1 shows an exploded view of a first preferred embodiment of the present invention of a beverage brewing apparatus, FIGS. 2A and 2B respectively show front and side views of the beverage maker of FIG. 1 in assembled form.
Figure 2A:
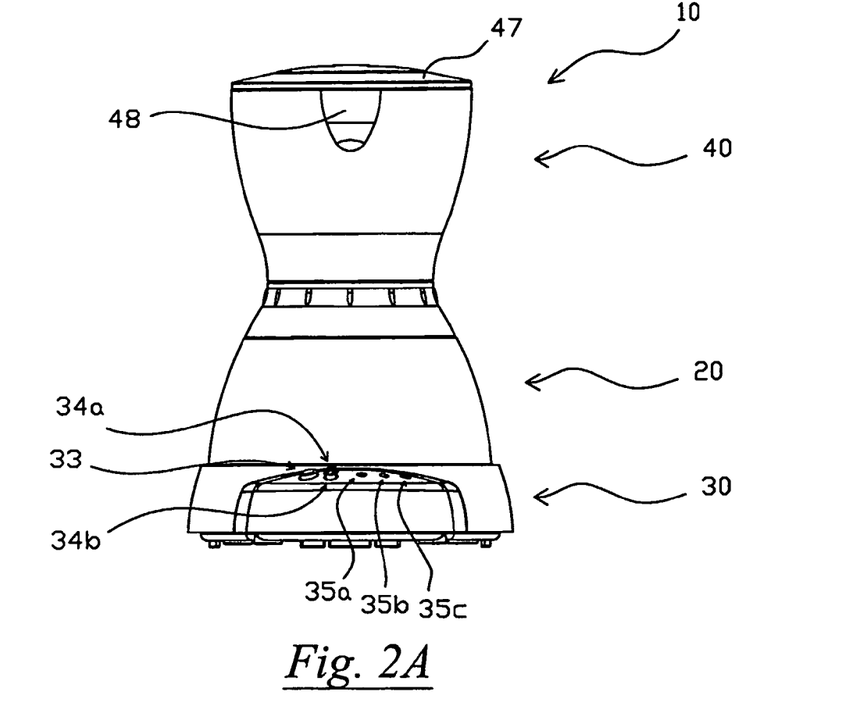
Figure 2B:
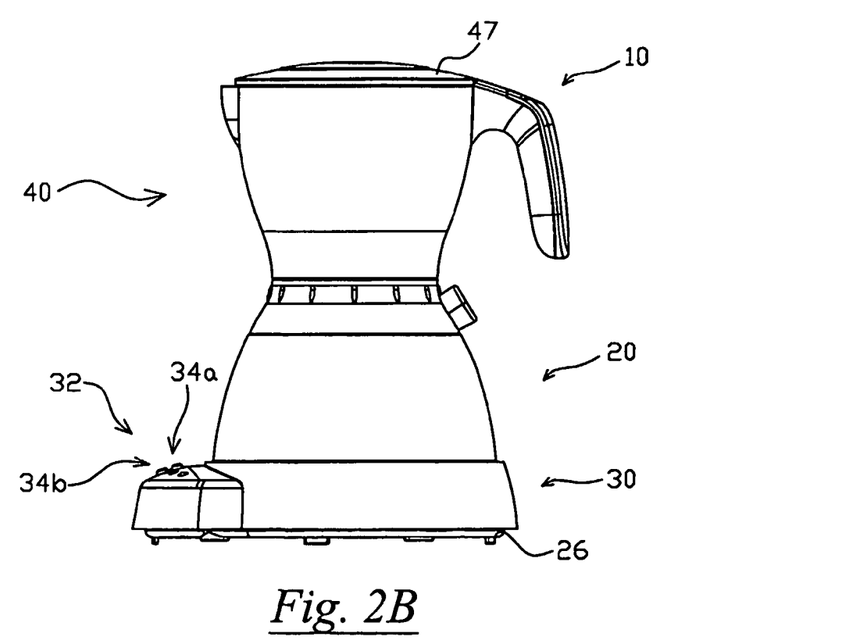
Figure 3:
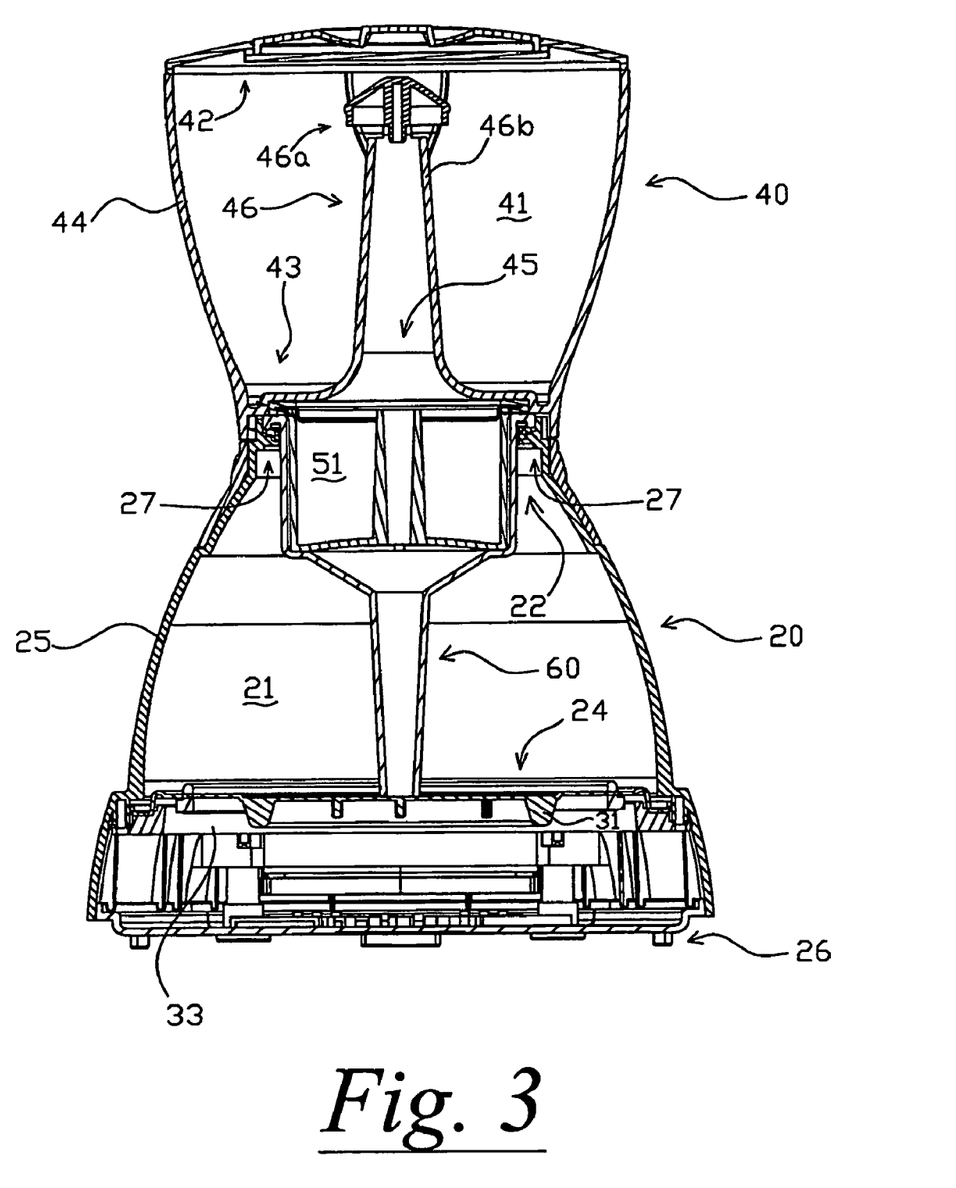
FIG. 3 shows a cross-sectional view of the beverage maker of FIG. 2, the section being taken longitudinally through the middle of FIG. 2 when viewed from the right side.
Figure 4:
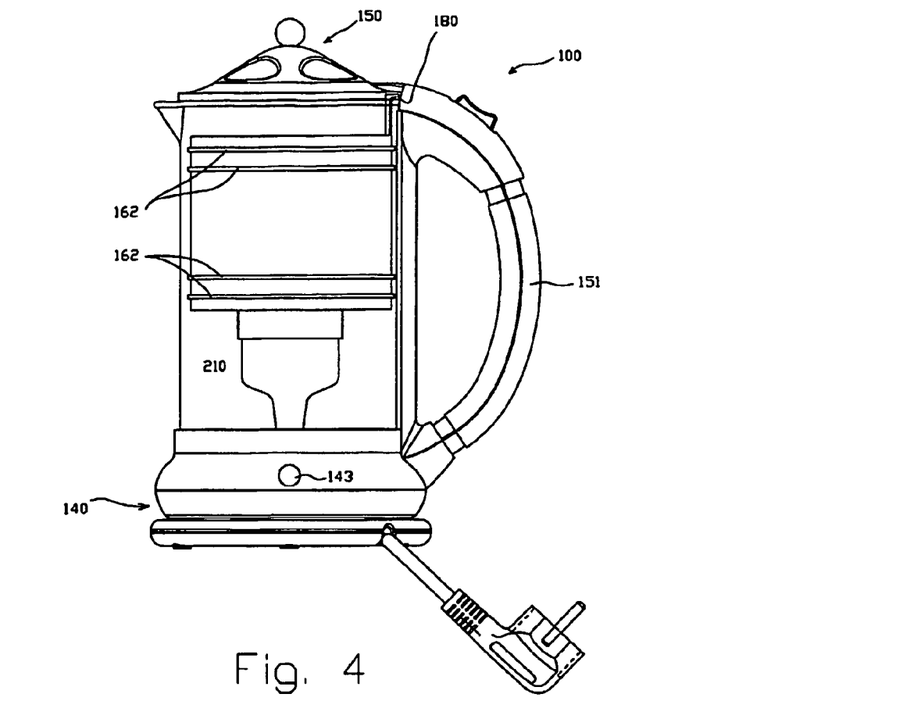
FIG. 4 is a side view of a second embodiment of a beverage maker of the present invention.

Referring to FIGS. 1 to 3, there is shown a first preferred embodiment of a beverage making apparatus ("beverage maker" for succinctness) of the present invention.

The beverage maker 10 includes a first fluid vessel 20, a heating compartment 30 and a beverage container 40. The first fluid vessel 20 includes a fluid compartment 21 for receiving water or other appropriate fluid for making beverages. The fluid compartment 21 includes a top portion 22 with an aperture 23, a bottom portion 24 and a peripheral wall 25 which interconnects the top and the bottom portions. The peripheral wall 25 defines the space of the fluid compartment 21. The beverage maker 10 is supported on an insulated base 26.

The fluid compartment 21 can be formed from metal, glass or hard plastics. To ensure good thermal conductivity between the heating elements in the base the fluid compartment 21, the bottom portion 24 of the fluid compartment 21 is made of metal or other thermally conductive material. Of course, the fluid compartment 21 including its bottom portion 24 can be made of glass or other heat resistant and transparent materials for better eye appeal. Naturally, the first fluid vessel 20 can be made from a combination of metal and non-metal.

The top portion 22 of the fluid compartment 21 includes a radially or transversally extending shoulder portion 27 with an aperture 23 surrounded by the shoulder portion 27. The inside edge of the aperture is provided with screw threads for threaded engagement with a corresponding flange or threads on the outer edge of the beverage processing means to be explained below.

Fastening means, such as stud-and-slot arrangements, are provided on the top or upper most edge of the first fluid vessel 20 for detachable engagement with the corresponding beverage container 40. The fluid compartment 21 is mounted on the heating compartment 30 inside which electrical heating elements 31 for heating the fluid inside the fluid compartment 21 are installed. The heating elements 31 are elevated above the bottom of the supporting base 26 to avoid overheating of the supporting surface.

A control panel 32 with a layout of control means for user control of the brewing operation is provided on the front of the beverage maker 10. The control means includes heating power control means 34 which are provided for controlling and varying the thermal power generated by the electrical heating means 31 for enhanced controllability of the brewing process. By selecting an appropriate brewing power level or brewing power sequence, a user can control or activate the preferred brewing process.

The heating power control means include "on/off" 33, "up" 34a, "down" 34b, and three power level selection buttons 35a-c corresponding to "Hi", "Lo" or "Medium"

heating power levels are provided. For example, a person preferring beverages with a strong flavour may choose a slow brewing process by selecting "Lo" power while persons preferring a weaker copy may choose the fast brewing process by selecting the "Hi" power option. The "up" 34a and "down" 34b buttons provide means to fine tune to or gradually vary the heating power from the selected power level. Of course, analogue power control means such as a power varying dial or a control knob with multiple power level selection or graduation can be provided to vary the heating power.

The heating element 31 can be, for example, a heater assembly comprising a group of independently controllable coil heaters which are mounted proximal to the bottom portion of the fluid compartment 21 for optimal heat transfer. In the present embodiment, the heating compartment 30 is fastened to the first fluid vessel 20. Of course, the heating compartment 30 and the first fluid vessel 20 can also be detachable from each other for easy cleaning or maintenance.

The beverage container 40 includes a beverage compartment 41 with a top portion 42, a bottom portion 43 and a peripheral wall 44 interconnecting the top and bottom portions. The bottom portion 43 includes an aperture 45 which is surrounded by an overflow means 46. This overflow means 46 includes an elevated overflow outlet 46a and an upwardly extending tubular member 46b which surrounds the aperture 45. The tubular member 46b (or the second fluid guiding means) provides a guide for the flow of beverage from the beverage processing means below to the beverage container 40 in a manner to be explained below. The overflow means with the elevated overflow outlet ensures that the beverage inside the beverage container 40 will not flow back to the fluid compartment during normal use.

A hinged lid 47 is also provided to cover the beverage compartment 41 to avoid splashing of the beverage from the beverage container during brewing. A spout 48 is provided on the upper part of the peripheral wall 44 so that the beverage can be dispensed smoothly. The peripheral wall 44 of the beverage container can be made of metal, glass, plastic or other heat resistant materials, although a transparent heat resistant material may be more aesthetically pleasing and can indicate the level and the conditions of the beverage already brewed. Similarly, the bottom portion of the beverage container 40 can be made of metal or other heat resistant hard plastics.

In this example, the overflow means 46 is integrally formed with the bottom portion of the beverage container. Of course, the overflow means can also be detachable from the beverage container, for example, by snap- or -screw fitting. Of course, sealing means can be used to improve fluid tightness. A handle is also formed on the beverage container 40 so that it can be easily removed for beverage dispensing.

The beverage processing means includes a brewing compartment 51 for receiving beverage making substances such as ground coffee beans, tea leaves, herbal leaves, insoluble granules with flavour and other similar substances. This brewing compartment 51 includes a cylindrical wall 52 with a fluid inlet and a fluid or beverage outlet. To retain the brewing substances inside the compartment, a perforated filtering means 53 is provided at the fluid inlet to prevent insoluble substances from entering the fluid compartment 21 through the first fluid guiding means 60. This perforated filter 53 can, for example, be a meshed element, a perforated plate, a grille or a wire screen or other appropriate filtering means or elements which allow passage of fluid but prevents through passage of particles or granules exceeding a certain average size. A locking or support member 54 is provided to fasten the filter means in position.

To prevent brewing substances from entering the beverage container 40, a particle blocking means 55 is installed adjacent to or immediately before the fluid outlet of the beverage substances receiving compartment 51. This particle blocking means 55 can be similar to the filter 53 at the fluid inlet and performs similar functions. The particle blocking member 55 is retained in the space between the beverage container 40 and the first fluid vessel 20 when they are fastened together. A sealing member 56 is provided between the particle blocking member 55 and the first fluid container 20 for appropriate sealing between the beverage processing means and the beverage container. The beverage substances receiving compartment 51 is received inside a first fluid guiding means 60. The first fluid guiding means includes a funnel-shaped member having a compartment 61 shaped for receiving the cylindrical member 52 of the beverage substances receiving compartment 51. The compartment 51 is surrounded and enclosed by a peripheral wall 63. The bottom of the compartment 61 is connected to a tubular portion 62 which has a generally smaller dimension than the bottom of the compartment 61 and extends towards the bottom portion 24 of the fluid compartment 21. This funnel-shaped member 60 is provided with an external flange for screw fitting with the screw threads provided on the inside of the aperture 23 formed on the top portion 22 of the fluid compartment 21 for secure arrangement.

Turning now to the operation of the beverage maker of FIGS. 1, 2 and 3. After beverage brewing substances, such as ground coffee beans, tea leaves, herbal leaves or the like, have been placed inside the brewing substances receiving compartment 52, the assembled beverage processing means is then secured to the water filled fluid compartment 21 which is then heated by the electrical heating means. Since water is filled to above the lower inlet of the tubular portion 62, the steam generated by the electric heating means cannot escape.

When the fluid compartments 21 has been sufficiently heated, the steam vapour pressure inside the fluid compartment 21 will force the hot water to move into the brewing substances receiving compartment 51 via its lower inlet and to interact with the beverage making substances inside the beverage receiving compartment 51. This interaction between the upwardly moving water and the beverage brewing substances allows the water or other appropriate fluid to draw flavour from the beverage brewing substances and produces a flavoured beverage. Continuous heating of the fluid compartment will cause the flavoured beverage to move further upwards towards the tubular member 46a of the second fluid guiding means 45. The flavoured or brewed beverage will then move on to the beverage compartment 41 through the elevated aperture of the overflow means 46. The elevated overflow aperture prevents reverse flow of the beverage back to the fluid compartment 21. A safety value 28 is provided on the fluid compartment to release excessive steam pressure during operation.

As the vapour pressure inside the fluid compartment is generally dependent on the rate of steam production inside that compartment, a user can by varying the heating power control the speed of passage of the water through the beverage brewing substances receiving compartment to control the transit time. Consequently, a user can control the brewing process to produce beverages according to his preference. As the heating power of this brewing apparatus is controllable and the variation is generally repeatable according to the power knobs or graduation provided for power indication, user can repeat the brewing process with reasonable certainty and ease without having too much concern about the variation or fluctuation of the heating power.

Referring to FIGS. 4 to 9, there is shown a second preferred embodiment of a beverage making apparatus 100 comprising a main container and a modular beverage processing means. The main container includes a top portion 110, a bottom portion 120 and a substantially cylindrical peripheral wall 130. The peripheral wall is made of a heat resistant and transparent material, such as glass, so that a user can monitor the brewing process and react when necessary. Of course, the main container can also be made of metal or heat resistant plastics.

The main container is supported on a base support 140 which includes a base compartment 141 inside which electrical heating elements 142, power control means and other useful means are placed. A light-emitting indicator 143 is provided on the base support 140 for indicating the operating states of the brewing apparatus 100. Of course, other additional displays such as time, temperature and power level can be provided in addition. A hinged lid 150 and a handle 151 are formed on the main container.

In this preferred embodiment, the beverage container and the beverage processing means are formed as a module 200. The beverage container 160 includes a cylindrical housing 161 with a circumferential sealing member 162 so that it can be closely fitted within the housing 130 of the main container. The circumferential sealing member 162 includes a sealing projection, such as an O-ring, which partitions the housing 130 into a lower part and an upper part such that steam inside the lower part enter the upper part through the circumferential sealing member 162.

The beverage container 160 also includes an overflow means 170 (or second fluid guiding means) and retention means 180. The overflow means is similar to that described in the first preferred embodiment above and protrudes from the bottom portion 163. The retention means 180 includes a handle or hook which protrudes from the top edge of the main container. This retention means is adapted so that the beverage container is kept in place during brewing. In this example, the hook member 180 is retained in position with respect to the main container by a latch when the hinged lid is closed.

Figure 5:
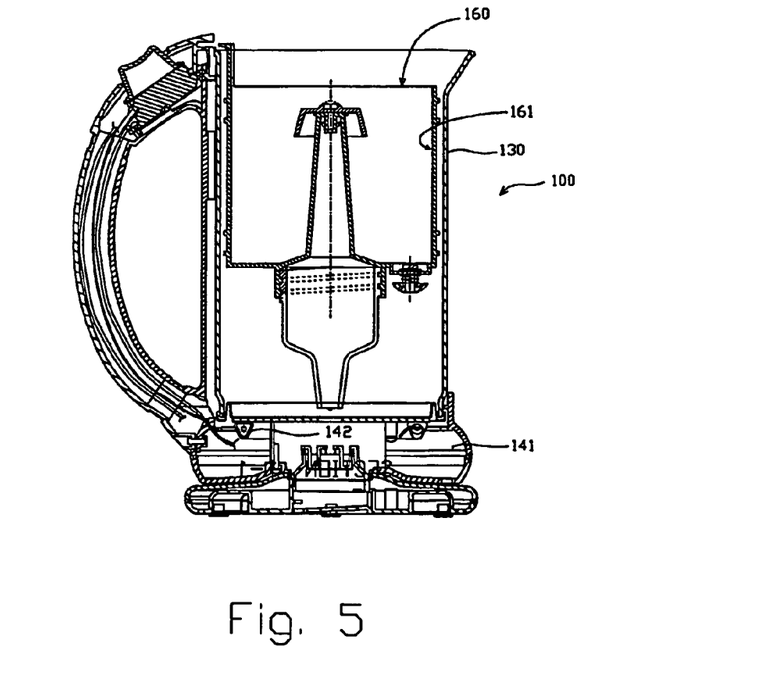
FIG. 5 is a longitudinally cross-sectional view of the beverage maker of FIG. 4, the section being taken through the middle of the beverage maker and intersecting with the spout and handle portion.
Figure 6:
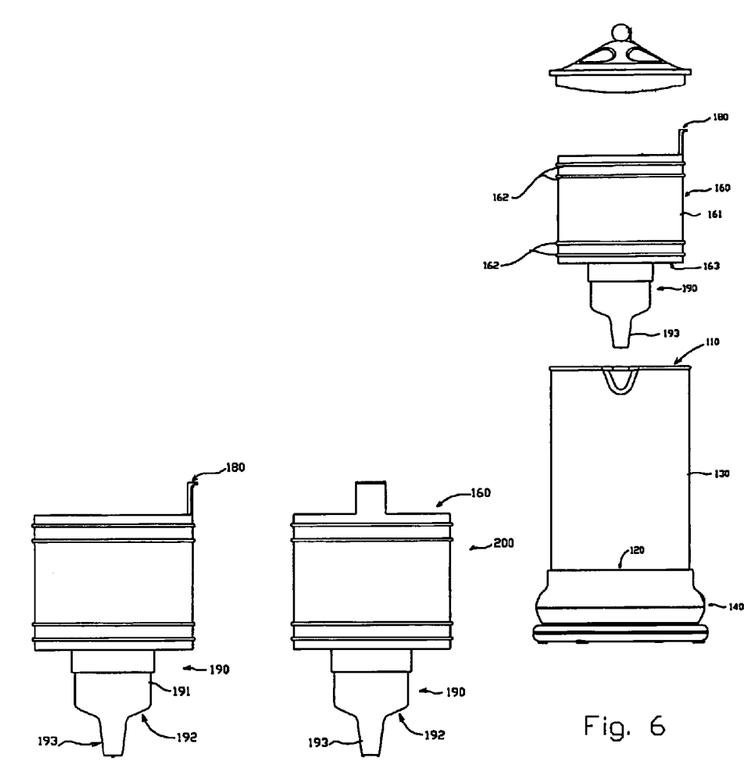
FIG. 6 is an exploded view of the beverage maker of FIG. 4.
Figure 7:
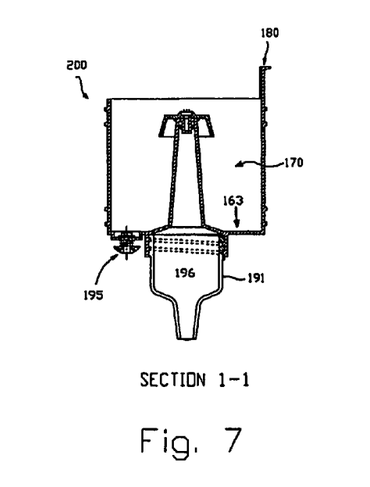
FIG. 7 shows various views of the sub-assembly, including the top view, a side view, the front view and the longitudinal cross-sectional view of the beverage processing means taken along the same section as FIG. 5.

Referring to FIGS. 5 to 7, the beverage container 160 includes a funnel-shaped member 190 having a substantially cylindrical housing 191, a shouldered portion 192 and a narrower stem member 193. The funnel member 190 is attached to the bottom portion 163 of the beverage container 160 by, for example, screw threads. This narrower stem member 193 is equivalent or corresponds to the second fluid guiding means of the first preferred embodiment.

A compartment for receiving the beverage brewing substances is formed by the circumferential wall of the cylindrical housing 191. Likewise, filtering and blocking means are respectively provided at the fluid inlet and outlet of the brewing substances receiving compartment. To enhance safety, a pressure releasing valve 195 is also provided at the bottom portion of the beverage container.

In use, after beverage making substances have been placed inside the beverage substances receiving compartment (defined by the circumferential wall 191) with the filter and blocking member put in place, the module is secured to the underside 163 of the beverage container 160. The module or sub-assembly, comprising the beverage container and beverage processing means, is then inserted into the main housing which has already been filled with water or other appropriate fluid.

Because of the close fitting between the sealing members 160 and the main container, when the fluid inside the lower portion 210 of the main container is heated, vapour pressure built up inside the fluid compartment 210 will force water to move up the funnel-shaped member 190 and then to the beverage container 160. During transit of the hot water through the beverage processing means, the water will draw flavour from the beverage making substances before entering the beverage container. Similarly, by varying the electrical heating power supplied to the electrical heating elements, the beverage making process can be better controlled and adjusted according to personal preferences.

Figure 8:
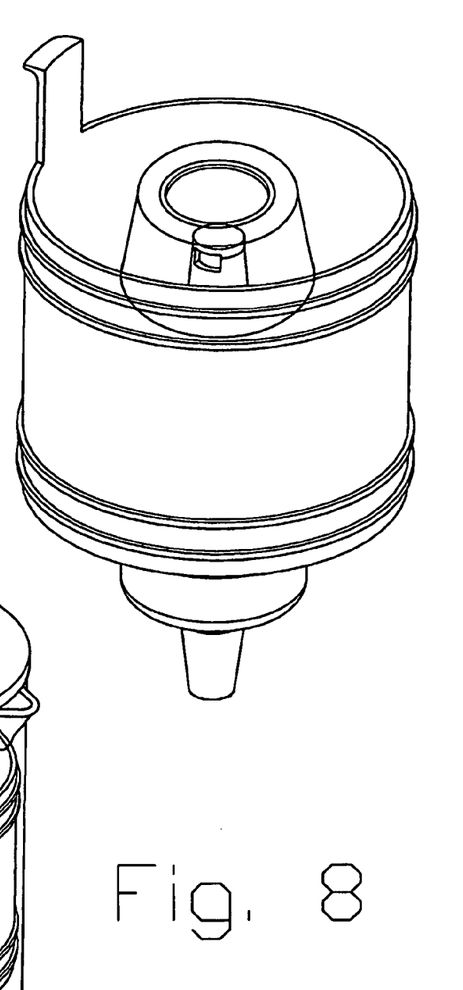
FIG. 8 shows a perspective view of a preferred example of the beverage processing sub-assembly of the present invention, and, FIG. 9 is an exposed view showing a combination of the sub-assembly of FIG. 8 with a main container similar to that of a conventional press type beverage maker.
Figure 9:
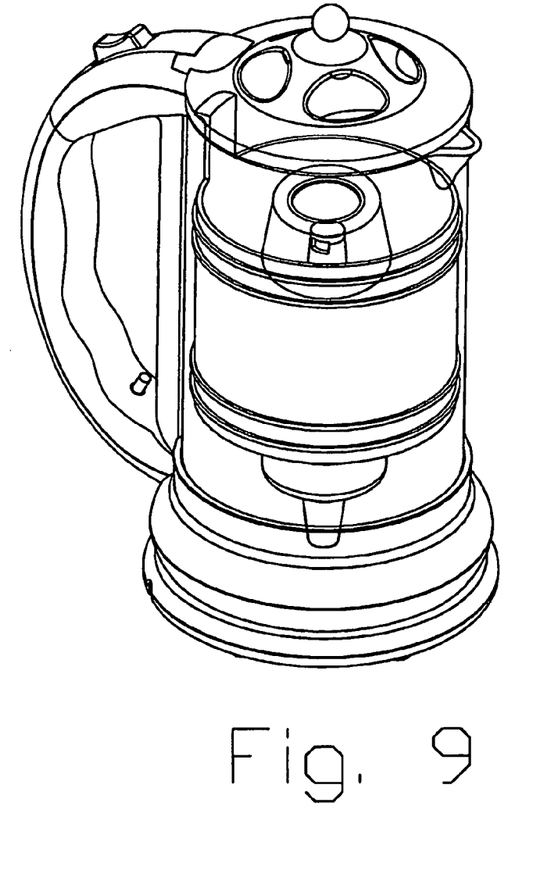

It will be noted that the beverage container, the beverage processing means, the beverage processing means, the overflow means and the fluid guiding means are formed as a sub-assembly 200 and can be inserted into or removed from the main container as a single unit, thereby providing additional flexibility and convenience to users. Because of this modular design, a conventional French Press device can be easily converted into a device of the present invention and vice versa. Hence, and in another perspective, a common housing can be shared between a water boiler, a French Press and a beverage making apparatus of the present invention. Accordingly, consumers can mix and match the brewing modules with the main containers according to their preference and as and when desired.

While this module includes the beverage container, it will be appreciated that a similar module comprising the beverage processing means, the sealing means (or partitioning means), the overflow means, the fluid guiding means but without the beverage container can be made. With this arrangement, the upper portion of the main housing will become the beverage container and beverages can be dispensed from the beverage compartment above the sealing or partitioning member.

In a further embodiment of the present invention, the beverage making apparatus as shown in FIGS. 4 to 7 can be modified for compatibility with a microwave oven. In this case, the heating elements are no longer necessary and the apparatus can be made of a microwave permeable or compatible material. More specifically, the beverage processing sub-assembly can be made of a microwave compatible material so that it can be used with the main container of a French Press for microwave oven brewing of beverages.

While the present invention has been explained by reference to the preferred embodiments described above, it will be appreciated that the embodiments are only examples provided to illustrate the present invention and are not meant to be restrictive on the scope and spirit of the present invention. This invention should be determined from the general principles and spirit of the invention as described above. In particular, variations or modifications which are obvious or trivial to persons skilled in the art, as well as improvements made on the basis of the present invention, should be considered as falling within the scope and boundary of the present invention. Furthermore, while the present invention has been explained by reference to certain type of beverage, it should be appreciated that the invention can apply, whether with or without modification, to other beverages or beverage brewing substances application.

The invention claimed is:

1. A beverage making apparatus including a fluid compartment, a beverage compartment, beverage processing means intermediate said fluid compartment and said beverage compartment, heating means and a user controllable heating power control means, said heating means being adapted for heating fluid inside said fluid compartment to generate steam in said fluid compartment so as to force fluid to move from said fluid compartment through said beverage processing means to said beverage compartment, wherein the heating power of said heating means is variable by said user-controllable heating power control means to control the rate of steam production in said fluid compartment through varying the heating power output of said heating means, whereby the transit time of a fluid transiting from said fluid compartment through said beverage processing means is controllable.

2. A beverage making apparatus according to claim 1 and including a base on which said fluid compartment is supported, said electrical heating means being a variable power output electrical heating means, wherein the rate of steam production in said fluid compartment is controllable by selecting one of said plurality of discrete heating power levels for varying the heating power output of said heating means.

3. A beverage making apparatus according to claim 2, wherein said fluid compartment is heated by said heating means in said base to generate steam whereby fluid is moved from said fluid compartment to said beverage compartment, and wherein said user-controllable heating power control means further comprises means for gradually adjusting the heating power output of said heating means.

4. A beverage making apparatus according to claim 2, wherein said beverage making apparatus includes a control panel on said base, and wherein said heating power control means and a power level indication means are located on said control panel.

5. An apparatus of claim 1, further comprising an overflow means connected to an exit end of said beverage processing means, wherein said heating means includes electrical heating elements disposed underneath said fluid compartment, the heating power output and the consequential rate of steam generation being variable by said heating power control means, said control means and said heating means being disposed on a housing which is detachably connectable with either said fluid compartment or said beverage compartment.

6. An apparatus according to claim 1, wherein said fluid compartment includes a built-in control panel and said beverage compartment is detachably connected to said fluid compartment so that, when in use, said beverage processing means is sandwiched between said fluid compartment and said beverage compartment, the plurality of discrete power levels correspond to different power output levels of said heating means, and wherein a higher power output level produces a beverage of a weaker flavor while a lower power output level produces a beverage of a stronger flavor.

7. An apparatus according to claim 6, wherein the junctions between said beverage processing means and said fluid compartment are substantially air-tight.

8. An apparatus according to claim 6, wherein said beverage processing means includes an overflow means through which fluid from said fluid compartment enters said beverage compartment.

9. An apparatus according to claim 6, wherein said overflow means includes a fluid discharge outlet which is elevated above the bottom portion of said beverage compartment.

10. An apparatus according to claim 1 and including a container having a top portion, a bottom portion, and a peripheral wall interconnecting said top and bottom portions, said beverage processing means being a modular sub-assembly which is slidably movable along said peripheral wall, said beverage processing means including sealing means for partitioning said container into said fluid compartment and said beverage compartment, said beverage compartment being proximal to said top portion of said container.

11. An apparatus according to claim 10, wherein said apparatus further includes means for restricting movements of said beverage processing means within said container.

12. An apparatus according to claim 10 wherein said modular beverage processing means includes a hollow compartment intermediate of said top and bottom portions of said container for receiving beverage making substances, said modular beverage processing means further including partitioning means for separating said container into said fluid compartment and said beverage compartment, said partitioning means including a fluid blocking member extending between said hollow compartment and said peripheral wall of said container, said beverage compartment being defined between said fluid blocking member and said top portion of said container, said fluid compartment being defined between said blocking member and said bottom portion of said container.

13. An apparatus according to claim 12, wherein a sealing member is disposed between the outer end of said blocking member and the inside of said peripheral wall of said container.

14. An apparatus according to claim 13, wherein said sealing member comprises an O-ring.

15. An apparatus according to claim 13, wherein said beverage processing means is restrained within said container by a lid which covers the top portion of said container.

16. An apparatus according to claim 1, wherein said heating power control means includes means for selecting one of a plurality of discrete heating power levels.

17. An apparatus according to claim 1, wherein said heating means is located in a heating compartment, and said fluid compartment is mounted on said heating compartment.

18. An apparatus according to claim 17, wherein said heating power control means is located on the exterior of said heating compartment.

19. An apparatus according to claim 17, wherein said fluid compartment is disposed within a fluid vessel, and said fluid vessel is fastened to said heating compartment.

* * * * *